United States Patent
Hellholm et al.

(10) Patent No.: US 9,878,748 B2
(45) Date of Patent: Jan. 30, 2018

(54) DRIVE UNIT FOR TRACKED VEHICLE AND VEHICLE PROVIDED WITH DRIVE UNIT

(71) Applicant: BAE Systems Hägglunds Aktiebolag, Örnsköldsvik (SE)

(72) Inventors: Björn Hellholm, Arnäsvall (SE); Jens Wågberg, Domsjö (SE); Niclas Jonsson, Köpmanholmen (SE)

(73) Assignee: BAE SYSTEMS HÄGGLUNDS AKTIEBOLAG, Örnsköldsvik (SE)

( * ) Notice: Subject to any disclaimer, the term of this patent is extended or adjusted under 35 U.S.C. 154(b) by 98 days.

(21) Appl. No.: 14/787,674

(22) PCT Filed: Apr. 24, 2014

(86) PCT No.: PCT/SE2014/050496
§ 371 (c)(1),
(2) Date: Oct. 28, 2015

(87) PCT Pub. No.: WO2014/182216
PCT Pub. Date: Nov. 13, 2014

(65) Prior Publication Data
US 2016/0083028 A1   Mar. 24, 2016

(30) Foreign Application Priority Data
May 8, 2013   (SE) ...................................... 1350563

(51) Int. Cl.
*B62D 55/092*    (2006.01)
*B62D 55/084*    (2006.01)
(Continued)

(52) U.S. Cl.
CPC .......... *B62D 55/084* (2013.01); *B60K 7/0007* (2013.01); *B62D 55/092* (2013.01);
(Continued)

(58) Field of Classification Search
CPC .... B62D 55/084; B62D 55/10; B62D 55/125; B62D 55/092; B60K 7/0007
(Continued)

(56) References Cited

U.S. PATENT DOCUMENTS

| 2,515,552 A | 7/1950 | Davies et al. |
| 3,398,806 A | 8/1968 | Hendricks |

(Continued)

FOREIGN PATENT DOCUMENTS

| CN | 202175123 U | 3/2012 |
| EP | 1914154 A1 | 4/2008 |

(Continued)

OTHER PUBLICATIONS

International Preliminary Report on Patentability received for PCT Patent Application No. PCT/SE2014/050496, dated Nov. 19, 2015, 9 pages.

(Continued)

*Primary Examiner* — Tony Winner
(74) *Attorney, Agent, or Firm* — Morrison & Foerster LLP

(57) ABSTRACT

A drive unit for a tracked vehicle includes a track support beam, at least one drive wheel, a set of support wheels and an endless track, the drive wheel being arranged to drive the endless track running over the drive wheel and the set of support wheels. The drive wheel and the support wheels are rotatably attached in the track support beam. The drive unit further includes and electric motor attached to the drive wheel and integrated in the track support beam, and a support beam integrated lubrication system having a pump unit arranged for pressurized supply of lubricant to parts of the drive unit in need of lubrication.

18 Claims, 5 Drawing Sheets

(51) Int. Cl.
| | |
|---|---|
| *B62D 55/14* | (2006.01) |
| *B62D 55/10* | (2006.01) |
| *B62D 55/125* | (2006.01) |
| *B60K 7/00* | (2006.01) |

(52) U.S. Cl.
CPC ........... *B62D 55/10* (2013.01); *B62D 55/125* (2013.01); *B62D 55/14* (2013.01); *B60K 2007/0038* (2013.01); *B60K 2007/0076* (2013.01); *B60Y 2200/22* (2013.01); *B60Y 2200/222* (2013.01); *B60Y 2200/25* (2013.01)

(58) Field of Classification Search
USPC ....................................... 180/9.1, 9.21, 9.42
See application file for complete search history.

(56) References Cited

U.S. PATENT DOCUMENTS

| | | | | |
|---|---|---|---|---|
| 3,688,858 | A | * | 9/1972 | Jespersen ............... B62D 55/06 180/89.1 |
| 3,785,458 | A | * | 1/1974 | Caldwell ................. B60R 17/00 184/11.1 |
| 3,877,545 | A | | 4/1975 | Orr |
| 4,548,315 | A | | 10/1985 | Briggs |
| 5,799,743 | A | * | 9/1998 | Robinson ............. B62D 55/125 180/9.1 |
| 6,260,465 | B1 | | 7/2001 | Zonak et al. |
| 2006/0196727 | A1 | * | 9/2006 | Shields ................ B62D 55/092 184/29 |
| 2012/0097462 | A1 | | 4/2012 | Graner et al. |

FOREIGN PATENT DOCUMENTS

| | | |
|---|---|---|
| GB | 128280 A | 6/1919 |
| JP | 2012-144141 A | 8/2012 |
| WO | 2011/127607 A1 | 10/2011 |

OTHER PUBLICATIONS

International Search Report and Written Opinion received for PCT Application No. PCT/SE2014/050496, dated Aug. 13, 2014, 11 pages.

Office Action received for Swedish Patent Application No. 1350563-1, dated Dec. 10, 2013, 13 pages (6 pages of English Translation and 7 pages of Official Copy).

Extended European Search Report (includes Supplementary European Search Report and Search Opinion) received for European Patent Application No. 14794574.5, dated Dec. 5, 2016, 9 pages.

* cited by examiner

DRIVE UNIT FOR TRACKED VEHICLE AND VEHICLE PROVIDED WITH DRIVE UNIT

CROSS REFERENCE TO RELATED APPLICATIONS

This application is a U.S. National Stage patent application of PCT/SE2014/050496, filed on Apr. 24, 2014, which claims priority to Swedish Patent Application No. 1350563-1, filed on May 8, 2013, the entire contents of which are incorporated herein by reference.

FIELD OF THE INVENTION

The present invention relates to a drive unit for tracked vehicle. The present invention also relates to a vehicle such as a tracked vehicle.

BACKGROUND OF THE INVENTION

Track driven/tracked and wheeled vehicles of today are typically driven by drive systems/powertrains mainly based on fuel engines.

This also applies for forestry vehicle such as forwarders or harvesters which today typically are wheeled. The fact that most forestry vehicles are wheeled depends on that the opinion since the sixties was that these were felt to be more reliable than tracked vehicles. This has lately been started to be questioned as tracked vehicles e.g. facilitate lower impact on the ground, i.e. degradation of the ground.

In order to transfer the power from the fuel engine of a vehicle for creating drive torque of a wheel or track a large amount of gears, shafts, gear wheels, chain wheels or similar power transmitting components are typically needed which all need lubrication, maintenance and space. These components may also limit aspects such as e.g. ground clearance and how vehicle geometries may be constructed. Fuel engines also typically have a low efficiency.

These disadvantages results in vehicles of today including tracked vehicles being unsuitable for a number of different applications where there are demands on reliability in operation/environmental friendliness. This especially applies for tracked vehicles intended for forestry such as forwarders or harvesters which typically are operated day and night in multi-shifts and where losses of production caused by vehicle errors result in great financial consequences as the entire chain of logistics is affected. Today you go more and more towards so called "cut-to-length" logic within forestry which means that forwarders at the felling site cuts up timber based on information from clients regarding desired quantity, size and length. The timber is marked on the site and is then transported by a forwarder to a collection point where a timber vehicle such as a truck collects the timber and transports this further to the client such as a sawmill or a process industry. This combined with just-in-time logic results in a fall in production caused by error stand still of harvester or forwarder affecting all subsequent links in the logistics chain. Further the environment where these vehicles operate, i.e. felling sites and timber collecting sites, are located far away from service centres and/or service technicians which results in that it takes long time before service can be carried through by technicians on the site or in a workshop.

Consequently there is a need to present improvement within drive systems for tracked vehicles.

An object of the present invention is to provide a drive unit for a tracked vehicle which has low weight.

An additional object of the present invention is to provide a drive unit which is robust and has few moving parts.

An additional object of the present invention is to provide a drive unit for a tracked vehicle which is compact and takes up a small volume.

An additional object of the present invention is to provide a drive unit for a tracked vehicle which facilitates high operational reliability and efficiency for creating low operative expenses.

Another object of the present invention is to provide a drive unit for a tracked vehicle which facilitates service and maintenance.

An additional object of the present invention is to simplify service and maintenance of a in the tracked vehicle comprised track support beam and the components being parts thereof.

SUMMARY OF THE INVENTION

These and other objects, apparent from the following description, are achieved by a drive unit for tracked vehicle and e vehicle which are of the type stated by way of introduction and which in addition exhibits the features described below. Preferred embodiments of the drive unit and the vehicle are defined below.

According to an embodiment a drive unit for tracked vehicle is provided, wherein the drive unit comprises a track support beam, at least one drive wheel, a set of support wheels and an endless track, said at least one drive wheel being arranged to drive said endless track running over said at least one drive wheel and said set of support wheels. The at least one drive wheel and said set of support wheels are rotatably attached to said track support beam. The drive unit further comprises an electric motor attached to said at least one drive wheel and integrated in said track support beam, and a lubrication system integrated in the track support beam and comprising a pump unit arranged for pressurized supply of lubricant to parts of the drive unit in need of lubrication.

Hereby is facilitated a drive unit for a tracked vehicle which facilitates driving of the respective drive wheel of the vehicle and where high efficiency is provided by means of utilization of an electric motor. Further a drive unit with high operational reliability and robustness is achieved when electric motor and lubrication system is integrated, i.e. confined, and thereby not risking collision with objects which are passed by the vehicle during operation. Further a compact drive unit with low weight is achieved as structure of the drive unit does not need to be modified in size in order to fit the electric motor and lubrication system.

Further is hereby provided a track assembly configuration for a tracked vehicle, which track assembly configuration constitute an autonomous drive unit which may be driven in a reliable way with high performance. To, in addition to electric motor, integrate an active (pressurized) pump system in the track support beam results in the effect that electric motor, transmission device and other central components for propulsion of the track assembly may be given substantially higher performance and longer life-span than autonomous (self-driving) track assemblies according to prior art.

The integrated lubrication system typically comprises a lubrication reservoir for storage of lubricant, wherein the pump unit is arranged to pump lubricant from said lubrication reservoir to the drive unit parts in need of lubrication.

Further, the integrated lubrication system comprises at least one pressure conduit configured to guide the pressurized lubricant from the lubrication reservoir to the drive unit parts in need of lubrication.

Other advantageous aspects and embodiment of the lubrication system integrated in the track support beam are described in the subsequent detailed description.

According to another aspect the objects are achieved with a drive unit for a tracked vehicle comprising a track support beam, at least one drive wheel, a set of support wheels and an endless track. Said at least one drive wheel and said set of support wheels are rotatably attached to said track support beam. Said at least one drive wheel is arranged to drive said endless track running over said drive wheel and said set of support wheels. Said track support beam comprises an electric motor which is connected to said at least one drive wheel and integrated in said track support beam in a longitudinal direction of said track support beam.

According to an embodiment said track support beam of said drive unit comprises at least one partition plane for uncovering an inner space of said track support beam where said electric motor is integrated.

By providing a partition plane maintenance and service of said electric motor and the other components confined in said inner space is simplified.

According to an embodiment said partition plane is arranged to be sealable by means of a detachable cover arranged to be mounted lying against said partition plane of said track support beam. This simplifies access to said electric motor.

According to an embodiment said at least one drive wheel and said electric motor are arranged to be mounted in a front section of said track support beam.

According to an embodiment said track support beam is a skid beam.

According to an embodiment an output shaft of said electric motor is arranged at essentially the same height of said track support beam as a drive shaft of said track support beam, said drive shaft being arranged to drive said at least one drive wheel.

Hereby a simplified power transmission path from electric motor to drive wheel is achieved which makes the need for moving parts being part of the power transmission path low. This creates high operational reliability and reduces weight since the construction requires fewer parts and that fewer parts are hereby being subjected to wear. Further, reduced need for lubrication is achieved with this solution as fewer parts such as gears, gear wheels reducing this need.

According to an embodiment said drive unit comprises a transmission device integrated in said track support beam such that the axial main direction of extension of the transmission device is aligned with the output shaft of said electric motor.

According to an embodiment said electric motor is connected to a drive shaft arranged to drive said at least one drive wheel, via a transmission device comprising a planetary gear, a transmission shaft and a bevel gear, to which said drive shaft is connected.

According to an embodiment an end of said transmission shaft which is directed towards said electric motor is arranged to be connected to said planetary gear and an opposite end of said transmission shaft which is directed towards said drive shaft is arranged to be connected to said bevel gear.

According to an embodiment said at least one drive wheel is constituted by a drive wheel pair.

According to an embodiment said track support beam of said drive unit comprises an integrated lubrication system for lubrication.

According to an embodiment said track support beam of said drive unit comprises an integrated cooling system for cooling.

According to an embodiment said track support beam is configured for attachment to a chassis beam comprising control means for controlling said electric motor.

According to an embodiment said electric motor is configured for attachment to a combustion engine via a generator for power supply.

BRIEF DESCRIPTION OF THE DRAWINGS

A better understanding of the present invention will be had upon the reference to the following detailed description when read in conjunction with the accompanying drawings, wherein like reference characters refer to like parts throughout the several views, and in which.

DETAILED DESCRIPTION OF THE INVENTION

Herein the term "track support beam" refers to a structural element arranged to support ground engaging members such as e.g. an endless track.

Herein the term "skid beam" refers to an example of a track support beam.

Herein the term "drive unit" refers to a unit capable of bringing the unit and other units attached thereto in movement, i.e. driving the unit.

Herein the term "track assembly" refers to a unit of tracked vehicles comprising a track support beam, drive wheels and support wheels and a circumferential endless track, said unit being arranged to support and drive ground engaging members in the form of endless tracks. The term "track assembly" thus relates to an example of a drive unit adapted towards application for tracked vehicles.

Figure 1:
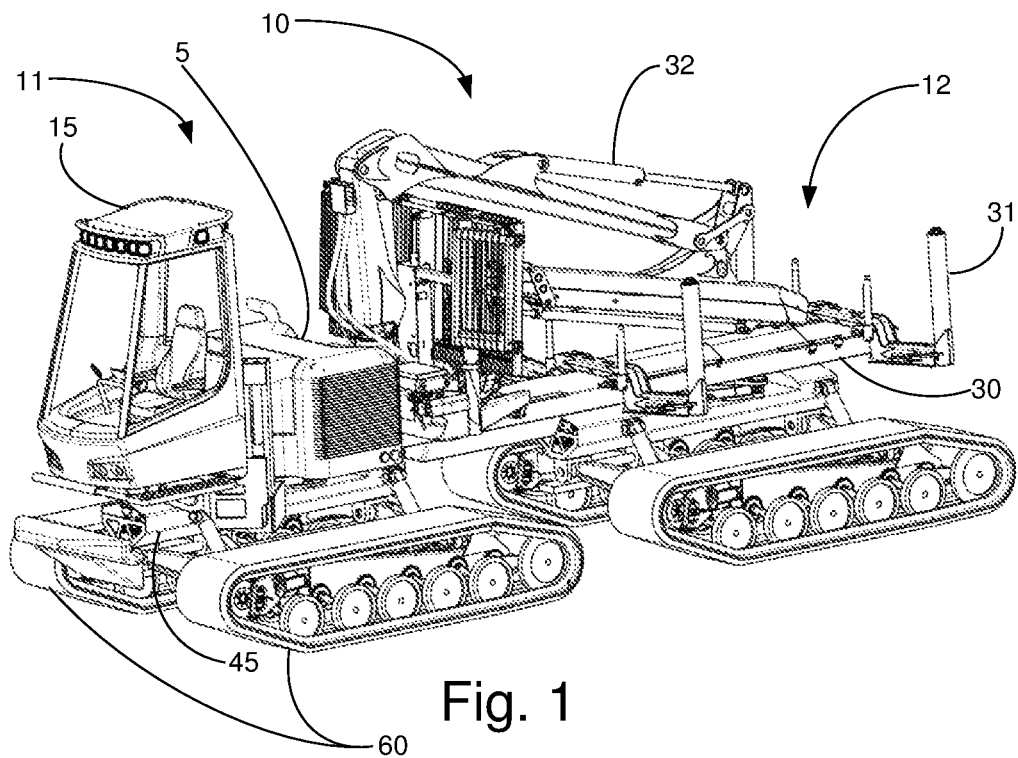
FIG. 1 schematically illustrates a perspective view of a tracked vehicle comprising drive unit pairs according to an embodiment.

With reference to FIG. 1 a tracked vehicle 10 according to the present invention, provided with a front vehicle unit 11 and a rear vehicle unit 12, is shown. Each of the front and rear vehicle units comprises a drive unit pair 60. Said drive unit pair 60 comprises two drive units arranged on opposite sides of the vehicle. The drive unit is constituted by a track assembly and are arranged for driving the vehicle. The respective drive unit pair is coupled together with an intermediate centre beam, such as a chassis beam. Said centre beam is arranged to support a vehicle structure, e.g. in the form of a vehicle cabin, power supplies, load carrying structure and a crane. According to this configuration of the vehicle, the centre beam of the front vehicle unit is arranged to support a vehicle cabin 15 and a power supply 5, such as an internal combustion engine, where the internal combustion engine according to one embodiment is constituted by a diesel engine. According to this configuration of the vehicle, the centre beam of the rear vehicle units is arranged to support a load-carrying structure comprising a load-carrying frame 30 and a U-beam configuration 31 for supporting timber. The load-carrying frame is according to this embodiment also arranged to support a crane 44 for loading/unloading of timber. The rear vehicle unit is also arranged to support a crane 32 for loading/unloading of timber.

The exemplified vehicle 10 is a tracked forestry vehicle in the form of a forwarder intended to transport timber from a harvesting site to a collection site. The vehicle according to the present invention may be constituted by any suitable tracked vehicle. According to one embodiment, the vehicle is a harvester intended for cutting timber.

Figure 2:
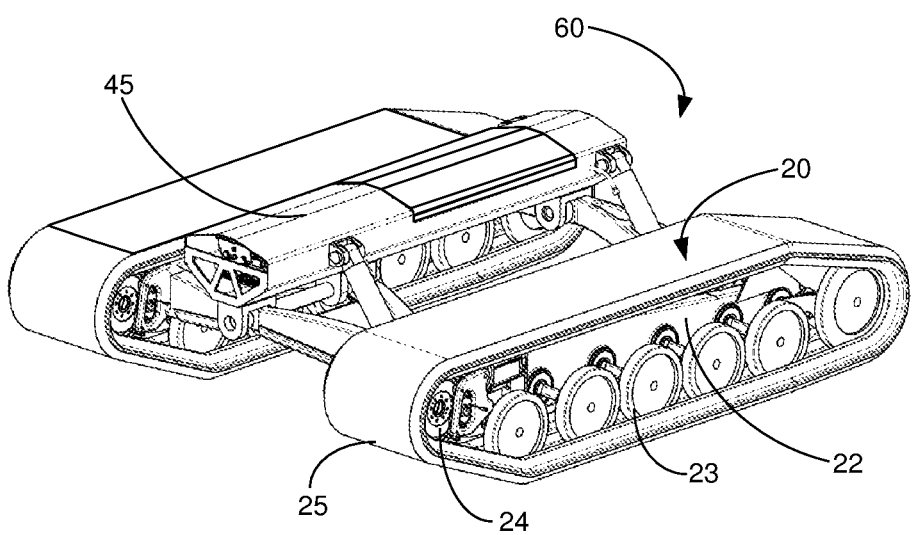
FIG. 2 schematically illustrates a perspective view of a drive unit pair according to an embodiment.

With reference to FIG. 2 a drive unit pair 60 coupled together with an intermediate centre beam is shown. In more detail a drive unit pair intended for a rear vehicle unit is shown, such as said rear vehicle unit 12 exemplified with reference to FIG. 1. The respective drive unit is constituted by a track assembly 20 arranged for driving of the vehicle. Said track assembly comprises a track support beam 22, which here is constituted by a skid beam. Said tracks assembly further comprises a set of support wheels 23, at least one drive wheel 24, and an endless track 25. Said set of support wheels and said at least one drive wheel are arranged to be suitably rotatably supported by said track support beam. Said endless track is arranged to run over said at least one drive wheel and said set of support wheels. Said set of support wheels are arranged in a pair configuration, i.e. the respective support wheel in each pair configuration is arranged on opposite sides of said track support beam. Said track assembly further also comprises an electric drive device 3 (shown in FIG. 5) drivingly coupled to said at least one drive wheel. Said electric drive device 3 is typically constituted by an electric motor.

The exemplified vehicle 10 is a diesel-electric driven vehicle, such as driven by said electric drive device 3, which is power supplied via a generator coupled to a combustion engine in the form of a diesel engine. The vehicle may have any suitable power supply for the propulsion of the vehicle. The vehicle is according to a variant hybrid-driven. The vehicle is according to a variant electrically driven, where power according to one alternative is effected by means of an energy storage device such as a battery unit, fuel cell or capacitor unit.

Figure 3:
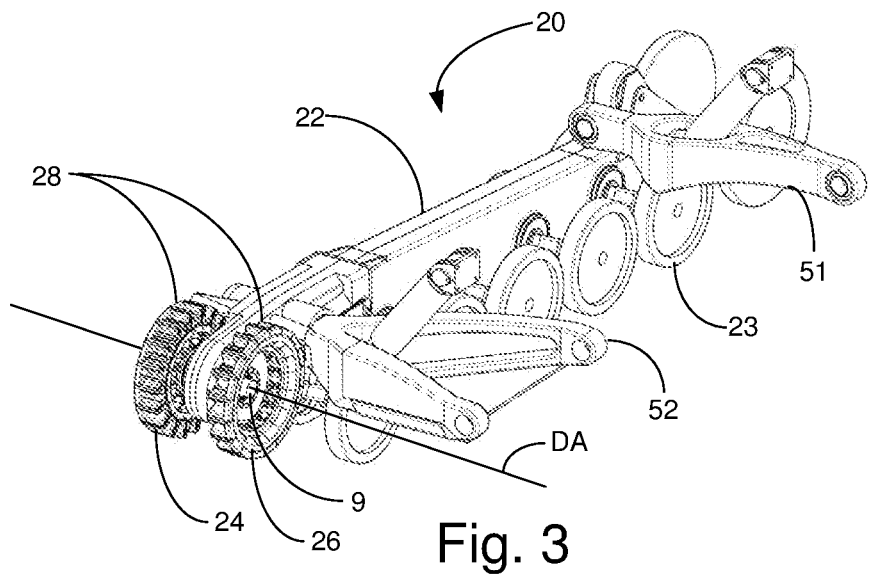
FIG. 3 schematically illustrates a perspective view of a track support beam according to an embodiment.

With reference to FIG. 3 a drive unit in the form a track assembly is shown where said endless track for illustrative purposes has been removed.

Said track assembly 20 comprises, like said track assembly exemplified with reference to FIG. 2, a track support beam 22, a set of support wheels 23.

Said track assembly further comprises a drive wheel pair 28 comprising a firsts drive wheel 24 and a second drive wheel 26 arranged on opposite sides of said track support beam. The first and second drive wheels are arranged to be driven by means of a drive shaft 9, defining an axis DA running transversely through said track support beam. Said track assembly further also comprises an electric drive device 3 (shown in FIG. 5) drivingly coupled to said at least one drive wheel via said drive shaft 9.

Figure 4:
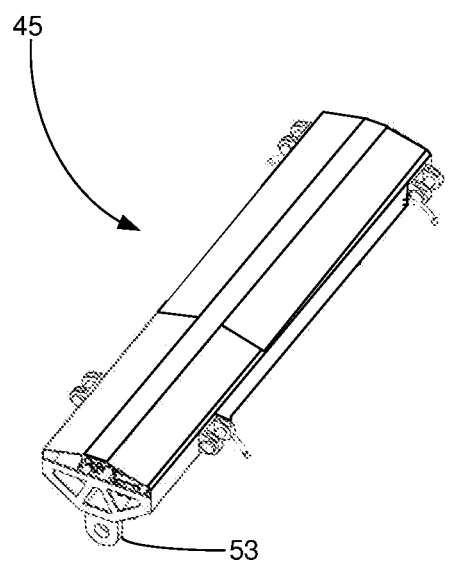
FIG. 4 schematically illustrates a perspective view of a centre beam according to an embodiment.

Said track assembly further comprises a first cross bar 51 and a second cross bar 52 configured for attachment via fastening members to a centre beam 45 (shown in FIG. 4). Said first and second cross bars are comprised in a suspension device for said track assembly 20 of the vehicle 10.

According to a variant said first and second cross bars are constituted by an A-arm.

FIG. 4 shows a centre beam 45 arranged for connection to a track assembly.

Said centre beam is arranged for supporting of vehicle structures. Said centre beam comprises attachment points 53 arranged on the underside of said centre beam, said attachment points being configured for attachment to fastening members 51, 52 (not shown in FIG. 3) of track assembly. In more detail said centre beam is arranged for attachment to two track assemblies, i.e. a track assembly pair, the two track assemblies in the track assembly pair being arranged on opposite sides of the centre beam such that the centre beam is arranged intermediate to said track assemblies of the track assembly pair and such that the main direction of extension of the centre beam is essentially parallel to the main direction of extension of the respective track assembly of the track assembly pair.

According to a variant said centre beam is constituted by a chassis beam arranged to support chassis structures.

Figure 5:
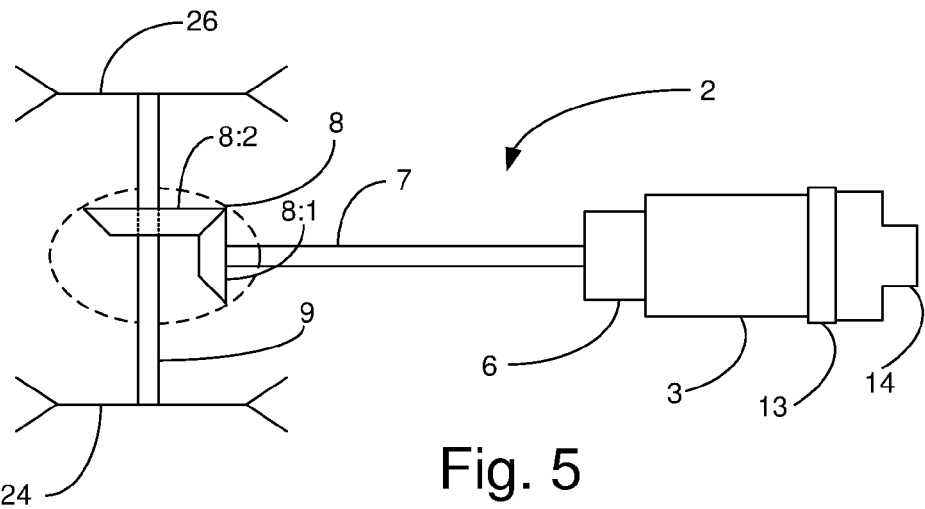
FIG. 5 schematically illustrates a diagram of a powertrain according to an embodiment.

With reference to FIG. 5 a powertrain 2 is shown intended to be integrated in a track assembly. Said power train comprises an electric drive device 3. Said electric drive device is configured for drivable coupling to said drive wheel pairs 24, 26 via a transmission device and a drive shaft 9. Said transmission device is constituted by a planetary gear 6, a transmission shaft 7 and a bevel gear 8. Said bevel gear comprises a first bevel gear element 8:1 provided with conical gear wheels and a second bevel gear element 8:2 provided with conical gear wheels, said gear wheels of said first and second bevel gear elements are meshed for power transfer. In more detail one output shaft 81 (shown in FIG. 6B), which transfer torque generated by a rotor of said electric drive device, is configured for coupling to said planetary gear for power transfer from said output shaft to said transmission shaft. Said transmission shaft is further configured for coupling to said bevel gear for power transfer from said transmission shaft to said drive shaft. Said drive shaft is further configured for coupling to said drive wheel pair for power transfer from said drive shaft to said drive wheel pair. This results in the output torque from the output shaft of said electric drive unit to input torque to said planetary gear. Said planetary gear then transfer torque input to said planetary gear to torque of said transmission shaft. Output torque from said transmission shaft is then transformed to input torque to said bevel gear. The input torque to said bevel gear is then transformed to input torque to said drive shaft arranged to drive said drive wheel pair. That is, said second bevel gear element 8:2 is arranged to rotate about said drive shaft 9 and said first bevel bear element 8:1 is arranged to rotate about said transmission shaft 7.

According to a variant said powertrain 2 further comprises a pump unit 13 arranged to pump oil from a reservoir, (not shown) arranged integrated in the skid beam, to parts in need of a lubrication, such as the planetary gear, the bevel gear, bearings etc. The oil being pumped from the pump may also be supplied to the electric drive device in the purpose of cooling it and/or providing lubrication of bearings of it.

According to a variant said powertrain 2 further comprises a parking brake unit 14 arranged such that when the vehicle is placed in a parked position activate a brake function which brakes said electric drive unit. Preferably said parking brake is arranged on a high speed side of the powertrain such that the size/weight of the parking brake unit can be minimized and that the braking force provided by the parking brake unit can be maximized through gear change.

Figure 6A:
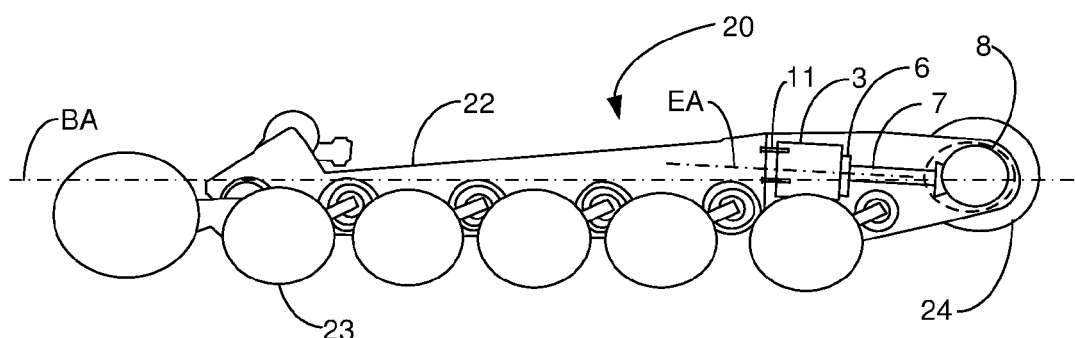
FIG. 6A schematically illustrates a side view of a drive unit according to an embodiment.
Figure 6B:
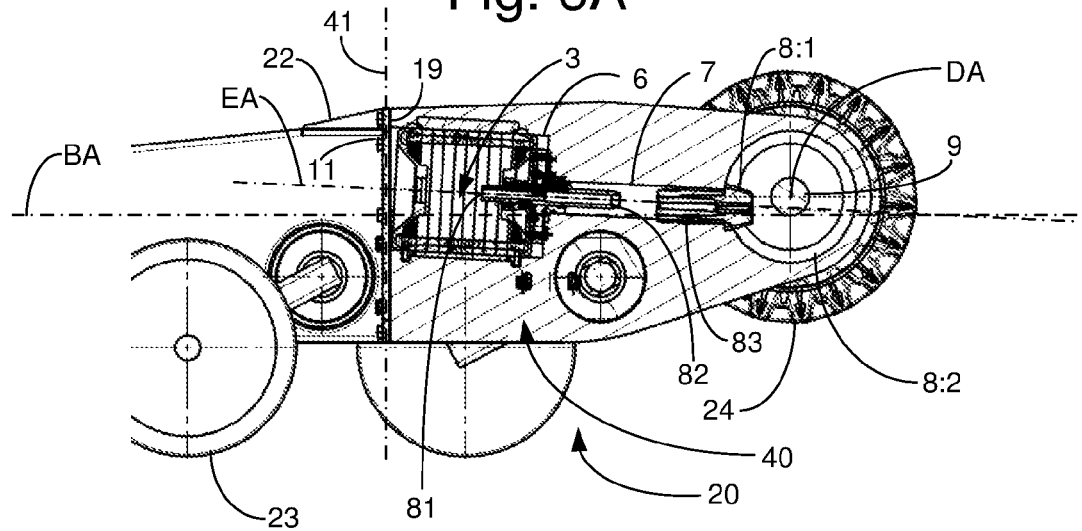
FIG. 6B schematically illustrates a side view of a front section of the drive unit in FIG. 6A in more detail.

With reference to FIG. 6A a track assembly comprising an integrated electric drive device is shown. With reference to FIG. 6B a front part of a track assembly comprising an integrated electric drive device shown in FIG. 6A is shown.

Said track assembly 20 comprises, like the track assembly exemplified with reference to FIG. 2, a track support beam 22, a set of support wheels 23 and at least one drive wheel 24.

Said track assembly 20 further comprises an electric drive device arranged integrated in said track support beam. Said electric drive device is arranged integrated in a front section of said track support beam. In more detail said electric drive device is arranged integrated in said track support beam such that an axis EA defining output shaft 81 of the electric drive device is essentially parallel to an axis BA defining the main direction of extension of said track support beam. That is, the electric drive device is arranged integrated in said track support beam in an essentially longitudinal direction of said track support beam. Said electric drive device is also arranged integrated in said track support beam at essentially the same height as a drive shaft 9 arranged to drive said drive wheels.

According to a preferred variant said electric drive device is arranged integrated in said track support beam such that the axis EA is essentially parallel to the axis BA and such that said electric drive unit is arranged integrated in said track support beam at essentially the same height as said drive shaft.

According to a variant said output shaft 81 of said electric drive device is arranged integrated in said track support beam at essentially the same height as said drive shaft.

Said track assembly further comprises a transmission device which is arranged integrated in said track assembly. Said integrated transmission device is arranged to transfer torque generated by said electric drive device to a drive shaft 9 arranged to drive said drive wheels 24. The axial main direction of extension of said transmission device is arranged aligned with said axis EA defining said output shaft of the electric drive device. Said transmission device comprises a planetary gear 6, a transmission shaft 7 and a bevel gear 8 (shown in FIG. 5), which is constituted by a first and second bevel gear element 8:1, 8:2. Said transmission shaft is arranged aligned with said output shaft of said electric drive unit. Said output shaft of said electric drive device is arranged to transfer torque generated by said electric drive device to said planetary gear. An output shaft 82 from said planetary gear is connected to said transmission shaft for transfer of torque from said planetary gear via said transmission shaft to an input shaft 83 of said first bevel gear element 8:1 of said bevel gear. Said first bevel gear element is connected to said second bevel gear element 8:1 for transfer of torque from said first bevel gear element to said second bevel gear element 8:2. Said second bevel gear element is connected to said drive shaft about which said second bevel gear element rotates during torque transfer for transferring torque to said drive shaft. Said drive shaft is arranged for connection to said at least one drive wheel, such as said drive wheel pair, for driving of said endless track 25 (shown in FIG. 2). This results in that one end of the transmission shaft, which is directed towards said electric drive device, is configured for connection to said planetary gear and in that an opposite end of said transmission shaft, which is directed towards said drive shaft, is configured for connection to said bevel gear.

Said electric drive device is configured to be attached to a structure 19 of said track support beam by means of a suitable joint 11. Said joint may according to a variant be constituted by a bolt joint.

For illustrative purposes a configuration of a track assembly only comprising one drive wheel is shown in FIG. 6A and in FIG. 6B. it should however be noted that this configuration may be provided with a drive wheel pair 28 comprising a first and a second drive wheel 24, 26 arranged on opposite sides of said track support beam (shown in FIG. 3).

According to a variant said track support beam comprises a partition plane 40 (shown in FIG. 6b as a hatched area) arranged to uncover an inner space of said track support beam in which space said electric drive device is integrated. According to this variant said partition plane is arranged to be sealable by means of a detachable cover arranged to be mounted lying against said partition plane of said track support beam. Said partition plane is arranged in a front section of said track support beam. Said front section is arranged in the front of said track support beam, i.e. in an end of said track support beam being directed in positive drive direction. According to a variant said partition plane is also arranged to uncover an inner space of said track support beam in which space said transmission device is integrated.

As is apparent from FIG. 6B the above described partition plane 40 is a longitudinal partition plane which runs in the longitudinal direction of the track support beam, which longitudinal direction constitutes the main direction of extension of the track support beam and essentially coincides with the direction of travel of the tracked vehicle.

Instead of or in combination with this longitudinal partition plane 40 the track support beam 22 is advantageously provided with a transversal partition plane running transversal to the longitudinal direction of the track support beam and essentially perpendicular to the longitudinal direction of the track support beam. Such a transversal partition plane is in FIG. 6B indicated with a reference number 41.

Also partition planes not being strictly perpendicular to the longitudinal direction of the track support beam is deemed to fall within the scope of what is herein intended with transversal partition plane. Transversal partition plane should hereby be deemed to refer to any partition plane along which the track support beam 22 may be divided in what may clearly be deemed to constitute a front 22A and rear section 22B of the track support beam 22.

Figure 6C:
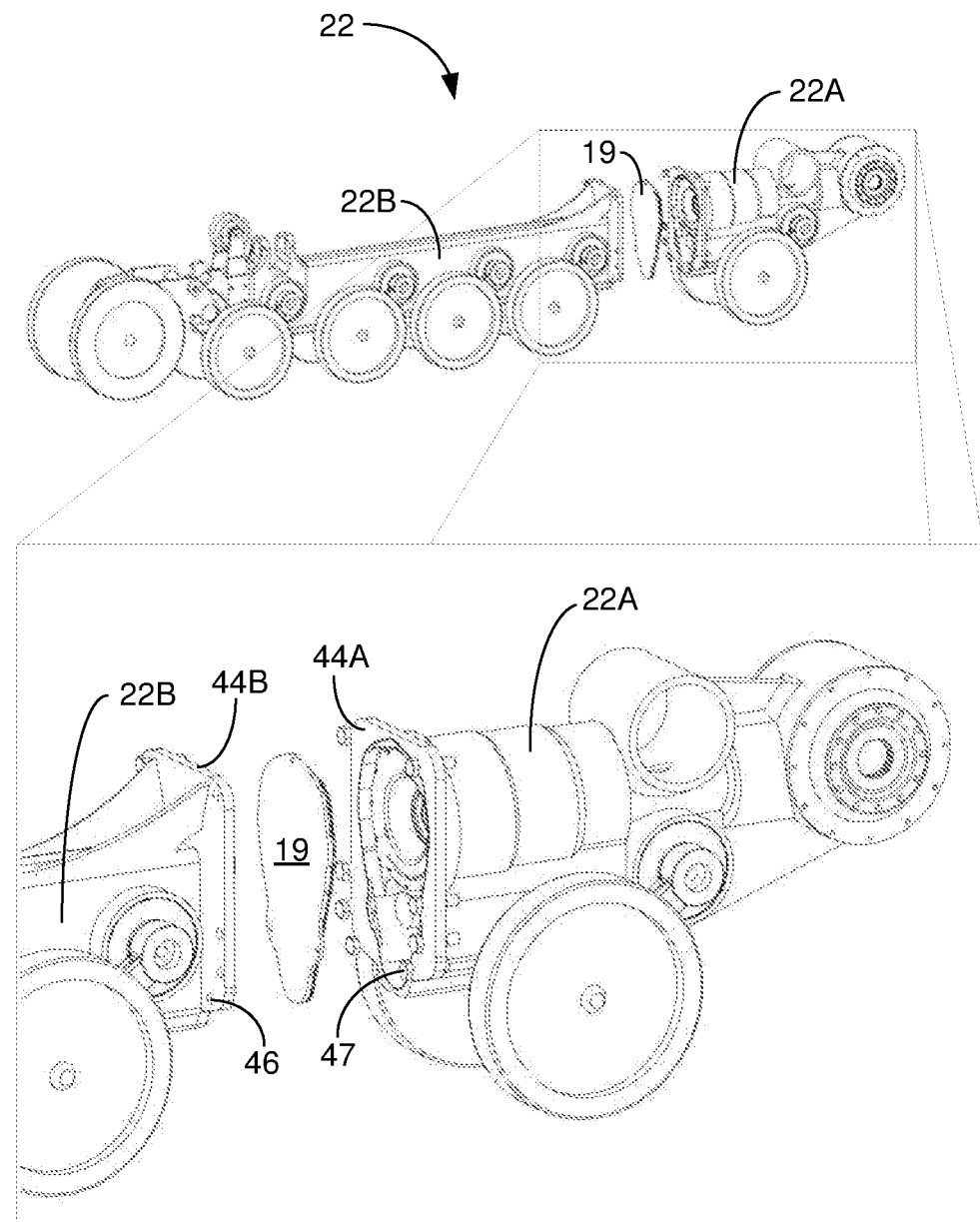
FIG. 6C schematically illustrates a perspective view of a track support beam divided along a transversal partition plane according to an embodiment.

FIG. 6C shows an exemplified embodiment of the transversal partition plane 41 in FIG. 6b, along which the track support beam 22 is configured to be divided in front section 22A and a rear section 22B. The front section 22A is arranged in the front of said track support beam 22, i.e. in an end of said track support beam 22 being directed in positive drive direction. The rear section 22B is arranged in the rear end of said track support beam 22, i.e. in an end of said track support beam being directed in negative drive direction.

The front section 22A is substantially smaller than the rear section 22B and thus constitutes a relatively small part of the track support beam 22. With "smaller" is here intended at least the length in the longitudinal direction of the track support beam. The length on the front section 22A is substantially shorter than half of the total length of the track support beam and preferably shorter than a third of the total length of the track support beam.

The transversal partition plane 41 is arranged to be sealable by means of the above mentioned structure 19, which structure in this embodiment constitutes a detachable sealing cover 19. Said sealing cover 19 is further arranged to seal an inner space of the track support beam 22, which inner space is arranged in said front section 22A of the track support beam 22. Said inner space is accessible via the transversal partition plane 41 by dismantling of said sealing cover 19. The front track support section 22A accommodates the electric drive unit 3, the transmission device 6, 7, 8 and a in the track support beam integrated 22 lubrication system, which will be described in more detail here below. At least parts of the electric drive unit 3 and the integrated lubrication system are accommodated in said inner space which is accessible via said transversal partition plane 41. Since the front section 22A of the track support beam 22 integrates the electric motor 3 this section 22A will occasionally for the motor comprised section in order to be able to distinguish it from the rear, non-motor comprised section 22B without directional indications.

An advantage with the transversal partition plane 41 is that the front 22A and rear section 22B of the track support beam 22 may be dismantled separately. Thereby service and maintenance of the different components of the track support beam is facilitated since only the part of the track support beam housing the component/components that need to be maintained or repaired need to be dismantled and moved. Further in case of irreparable errors of important system components in the track support beam all or part of the track support beam 22, i.e. the front 22A or rear 22B section, housing the irreparable component may be replaced to an entirely new such part. For example the entire front section 22A may be replaced by a new section in case of sever failure arising on e.g. the electric drive unit, the transmission device or the lubrication system. Replacing the entire track support beam 22 is in such situations difficult or impossible since its weight and size often makes transport of en entire track support beam to the site where the component has failed, particularly since this often is located in an inaccessible forested terrain. Since the electric drive motor 3, the transmission device 6, 7, 8 and the integrated lubrication system all are integrated in the front section 22A it is likely that a possible operation break down of the vehicle 10 is caused by errors of a component in said front section 22A. By facilitating easy exchange of the entire front section 22A the tracked vehicle 10 may quickly be placed in service again by delivering a new front section to the failure location at the same time as the broken section is taken therefrom for misdiagnosis and repair.

Figure 6D:
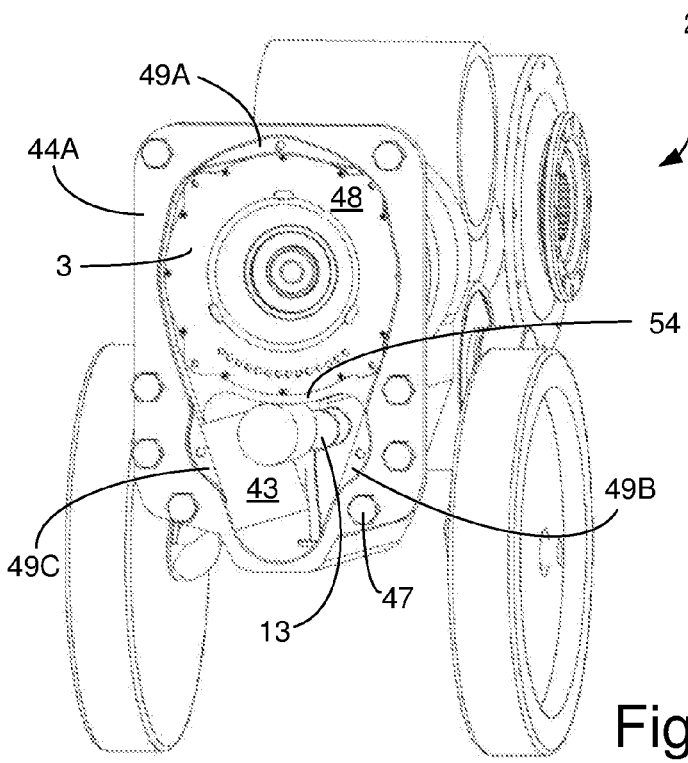
FIG. 6D schematically illustrates a perspective view of a front track support beam section according to an embodiment, after partition along the transversal partition plane.

FIG. 6D shows a cross section of the front section 22A of the track support beam along the transversal partition plane 41, with the sealing cover 19 dismantled and exposing said inner space in the front section 22A. As is apparent from FIG. 5D and FIG. 7 the inner space of the front section 22A is directly accessible via the transversal partition plane 41. This directly accessible space comprises a lower chamber 43 and an upper chamber 48, which at least partly are separated by a partition wall 54. As will be described in more detail the lower chamber 43 of the inner space constitute a reservoir for lubricant in the lubrication system integrated in the track support beam 22, which lubricant typically is constituted by oil. In the upper chamber 48 of the inner space the electric drive unit 3 is arranged. Accordingly, the lower chamber 43 is also referred to as the reservoir 43 in the descriptions below. The sealing cover 19 is configured to prevent lubricant from spilling out from said reservoir 43 when the front 22A and rear 22B section are separated from each other by dismantling of the track support beam 22. This is provided in that the sealing cover 19 is configured to constitute a removable wall of said reservoir 43, which seals the reservoir 43 when it is mounted for sealing said inner space of the front track support beam section 22A. An effect of the of the design of the sealing cover is that the oil reservoir 43 and therein mounted components of the integrated lubrication system, such as said pump unit 13, are easily accessible via the transversal partition plane 41, wherein the lubricant which usually is accommodated in the reservoir 43 may be tapped out through a tap hole (not shown). An additional effect of the design of the sealing cover is that it prevents spill of lubricant by dismantling of the track support beam 20, which simplifies by replacement or repair of the front 22A or rear 22B track support beam section.

The front 22A and the rear section 22B of the track support beam 22 are thus configured to be detachably mounted to each other. In an embodiment this detachable mounting is provided by means of a bolt joint. As is apparent from FIG. 6C and partly also 6D the transversal partition plane 41 comprises two flanges 44A, 44B, of which one sits on the front section 22A and one on the rear section 22B of the track support beam 22. Theses flanges 44A, 44B constitute contact surface between the front 22A and the rear 22B track support beam section 22. The two flanges 44A, 44B are provided with corresponding holes 46 (wherein bolts 47 are mounted in the holes of the front flange 44A in FIGS. 6C and 6D) wherein the flanges 44A, 44B and thereby the front 22A and rear 22B track support beam section are configured to be detachably mounted to each other by means of bolt joint.

Further the front flange 43A comprises a milled-out cover plane comprising the surfaces 49A-49C against which the sealing cover 19 is configured for detachable mounting. In this exemplified embodiment the cover plane and the sealing cover 19 are provided with corresponding holes for removable joining by means of screwing. In order to seal against the inner edge of the front flange 43A against which the outer edge of the sealing cover bears when the sealing cover is mounted against the milled-out plane, said outer edge of the sealing cover 19 comprises a milled-out track in which an o-ring is mounted for preventing leakage between the outer edge of the sealing cover and the inner edge of the flange when the sealing cover 19 is mounted against the milled-out cover plane.

According to an embodiment said track assembly comprises an integrated lubrication system. Said lubrication system is according to a variant integrated in said track support beam, such as integrated in said inner space of said track support beam. The lubrication system comprises a pump unit, such as said pump unit 13 exemplified with reference to FIG. 5. Said pump unit is connected to a reservoir comprising lubricant, such as lubrication oil. In more detail said pump unit is arranged to provide a flow of lubricant from said reservoir in a lubrication circuit/lubrication conduit which is connected to parts in need of lubrication, such as said planetary gear and/or parts of said electric drive device.

According to a variant said lubrication system also comprises a cooling functionality. This makes the lubrication oil also providing cooling. According to this variant said reservoir comprising lubrication oil of said lubrication system is arranged to cool said lubricant in that said lubricant is thrown towards the walls confining said reservoir when said pump unit pumps lubrication oil around in the lubrication system, i.e. pumps lubricant from said reservoir via said lubrication conduit/lubrication circuit back to said reservoir. Further said lubrication conduit/lubrication circuit through which lubricant is pumped by said pump unit may be arranged to provide cooling of said lubricant, i.e. structures of said track support beams which are arranged thermally applied to said lubrication conduit/lubrication circuit acts as coolers, i.e. cools said lubricant.

Figure 7:
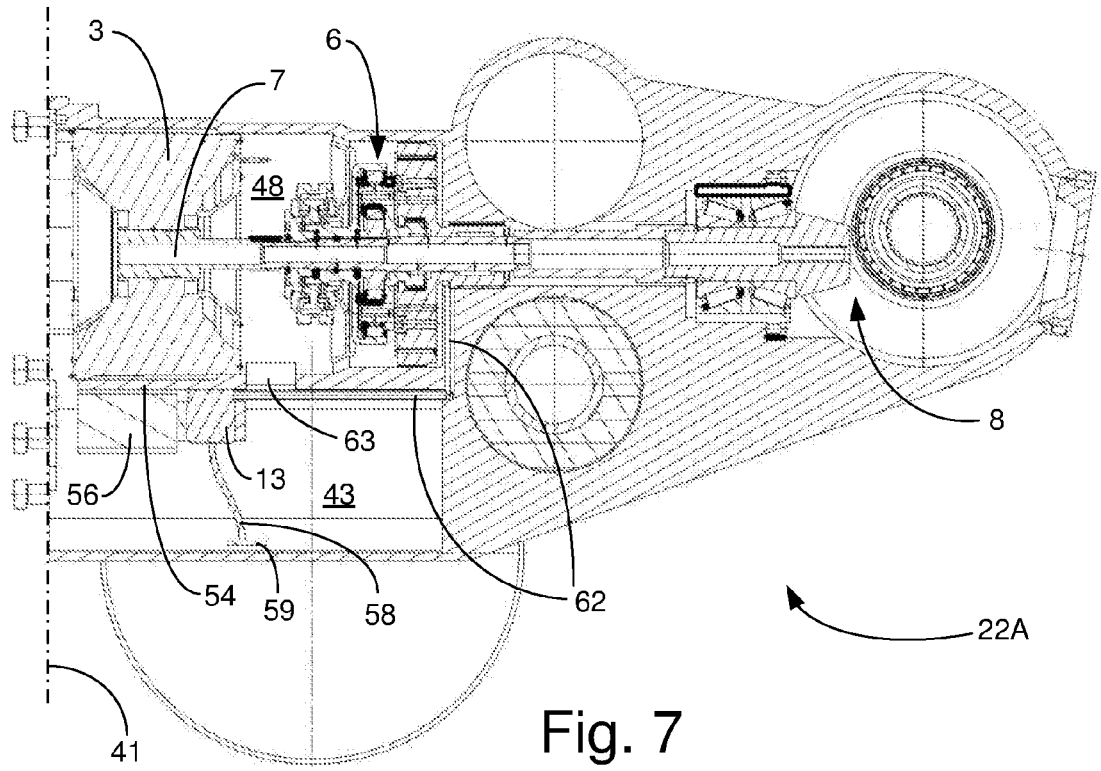
FIG. 7 schematically illustrates a side view of the front track support beam and a lubrication system integrated therein according to an embodiment.

A more detailed embodiment of the lubrication system integrated in the track support beam 22 will now be described with reference to FIG. 7.

As is apparent from earlier description the tracked vehicle 10 according to a preferred embodiment is provided with a track assembly pair 60 of which each track assembly 20 constitute an autonomous drive unit capable to be driven on its own by means of en electric drive device 3, such as en electric motor, integrated in a track support beam 22 of the track assembly 20. A transmission device for transfer of power from the electric motor 3 to the drive shaft 9, here comprising a planetary gear 6, a transmission shaft 7 and a bevel gear 8, are also integrated in the track support beam 20.

That the track assembly 20 constitutes an autonomous drive unit capable of being driven in and by itself means that drive wheel, support wheels, track and other components necessary for propulsion are entirely being supported by the track assembly itself. It is shall thereby be understood that the track assembly 22 according to the present description does not have any components necessary for propulsion journaled or in another way supported by a chassis beam, such as the chassis beam 45, or other by the chassis beam supported constructions constituting part of a vehicle body to which the track assembly is attached.

In order to reliably be able to drive the tracked vehicle 10 with optimal performance by means of the autonomous track assemblies 20 each track assembly 20 is provided with an active lubrication system, i.e. a lubrication system comprising active components for pumping lubrication mean to components in need of lubrication. Tracks assemblies according to prior art possibly comprise passive lubrication system, e.g. in the form of oil bath, but generally do not include any lubrication systems at all.

The active lubrication system for the respective as drive unit constituted track assembly 20 is integrated in the track support beam 22 of the track assembly. More particularly the lubrication system is integrated in the front section 22A of the track support beam 22. As mentioned above the lubrication system comprises a lubricant reservoir for storage of lubricant, such as lubrication oil, wherein the lubricant reservoir is constituted by the lower chamber 43 of the inner space of the front track support beam section 22A. It should in this respect be pointed out that the lubricant reservoir is not constituted by any separate container which has been integrated in the track support beam 22 but that the lubricant reservoir is constituted by a recess of the track support assembly itself, which recess forms said lower chamber 43 constituting lubricant reservoir.

The lubrication system comprises a pump device comprising the pump unit 13 mentioned earlier and an electric pump motor 56 for driving of said pump unit 13. The electric pump motor 56 is configured to be driven by separate electric feed, which means that the electric motor 3 is configured to drive the at least on drive wheel 24, 26 and the pump motor 56 independent of each other. Further the lubrication system comprises a suction conduit 58 and a suction filter 59. The pump device is arranged inside the lubricant reservoir 43 and configured to during operation be lowered in lubricant stored in the reservoir 43. An effect of the placement of the pump device is that the number of external conduits and connections are minimized. An additional effect is that the distances between pump and lubrication spots become short, which results short pressure conduits and low pressure drop, which in turn results in that the pump unit 13 and the pump motor 56 can be constructed relatively small.

The pump unit 13 is configured to pressurize the lubricant in order to then lead out the pressurized lubricant to the different components of the drive unit via a pressure conduit 62. The pressure conduit partly consists of a pipe which has been attached to the pump unit 13 and runs through a hole in the front wall of the reservoir 43.

The remaining parts of the pressure conduit 62 are typically cast or drilled in the front section 22A of the track support beam 22.

The pressure conduits 62 lead the lubricant out to parts in need of lubrication. These parts comprise at least certain rotating components of the planetary gear 6, such as surfaces for meshing of teeth and bearing surfaces, and typically also certain components of the electric motor 3.

The lubrication reservoir 43 is positioned at the bottom in the front track support beam section 22A and is thus positioned at a lower height than the drive unit components that are to be lubricated. Thereby lubricant that has been pumped out to these components can be made to flow back to the lubrication reservoir 43 under the influence of the gravitation. Because of this reason the partition wall 54 between the upper chamber 48 housing the electric motor 3 and the lower chamber 43 constituting lubricant reservoir 43 provided with at least one lead-through 63, e.g. in the form of one or more holes or tracks, through which the lubricant may flow from the upper chamber 48 to the lubricant reservoir 43. The upper 48 and lower 43 chambers are formed as recess of castings, wherein the front track support beam section 22A can be said to constitute a hollow castings construction. The drainage of lubricant from upper to lower chamber is suitably effected through holes in the goods being constituted by floor in the space of the upper chamber 48 where the planetary gear 6 is arranged.

Further the lubrication system is configured to constitute a combined lubrication and cooling system for drive unit components in need of lubrication and/or cooling, such as the planetary gear 6 and the electric motor 3. This is provided in that the lubrication reservoir 43 is configured for cooling of the lubricant being accommodated in the reservoir. As mentioned above the lower chamber and thus the lubrication reservoir 43 are designed as recesses from castings. The walls or the reservoir are configured to act cooling jacket by at least partly being arranged in direct contact with surrounding air, i.e. air that is not confined by the tracked vehicle 10 or any of its components and thereby risking being heated by operation of the tracked vehicle. These walls are solid casting walls with good heat conductibility wherefore the outer surface of the walls are cooled by surrounding air by means of convection cooling. Thereby heat from the lubricant accommodated in the reservoir will be guided and spread through the walls of the reservoir to surrounding air.

According to an embodiment said electric drive device 3 is arranged for coupling to a control unit arranged integrated in said centre beam 45 shown with reference to FIG. 4. Said control unit is configured for coupling to a central control unit (not shown), e.g. a central control unit arranged in the front vehicle unit 11 illustrated with reference to FIG. 1. The central control unit is configured for coupling to a throttle control of the vehicle such as an accelerator pedal, and to said control unit. In more detail said central control unit is configured for connection to two control units for control of the respective electric drive device integrated in the respective drive unit of said front vehicle unit and rear vehicle unit. This means that said central control unit is coupled via said two control units to all electrical drive devices being part of the vehicle. Preferably the front and the rear vehicle unit comprises two electrical drive devices, one in the left and one in the right drive unit, i.e. track assembly, of the front and rear vehicle unit respectively. For example a first control unit (not shown) may be arranged to control said respective electric drive devices integrated in said drive unit pair of said front vehicle unit and a second control unit may be arranged to control said respective electric drive devices integrated in said drive unit pair of said rear vehicle unit based on information generated by said central control unit. Wherein said first and second control units are arranged integrated in said centre beam connecting said drive unit pair of said front and rear vehicle unit respectively. According to a variant said central control unit is arranged to control a control unit (not shown) of a generator and a regulation system (not shown) of the diesel engine. According to this variant said generator is arranged to generate electric power based on power generated by the diesel engine. Further according to this variant said central control unit is configured for connection to said control unit of the generator and to said regulation system of the diesel engine. This results in that when the driver presses on the accelerator pedal the pedal position is transferred to a requested drive torque. This is then sent to the control units arranged to control the respective electric drive device, wherein the control units sends out desired level of voltage and current to the electric drive devices of the respective drive unit.

Said electric drive devices comprises according to a variant an electric motor. According to a variant said electric drive unit is constituted by any electric drive unit suitable for the application. According to a variant said electric drive device is constituted by an asynchronous motor. According to a variant said electric drive unit is constituted by an induction motor. According to a variant said electric drive unit is constituted by a permanent magnet (PM) motor. According to a variant said electric drive unit is constituted by an electric motor arranged to be power supplied with a three-phase alternating voltage, such as a 700V three-phase alternating voltage. According to a variant said electric drive unit is constituted by a three-phase alternating voltage generated by a generator coupled to a combustion engine 5, such as a diesel engine exemplified with reference to FIG. 1.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

Below some general aspects of the drive unit and the tracked vehicle according to the present description are listed.

Aspect 1: A drive unit 15 for a tracked vehicle 10 comprising a track support beam 22, at least one drive wheel 24, 26, a set of support wheels 23 and an endless track 25, where said at least one drive wheel and said set of support wheels are rotatably attached to said track support beam, where said at least one drive wheel is arranged to drive said endless track running over said drive wheel and said set of support wheels, characterized by comprising an electric motor 3 which is connected to said at least one drive wheel and integrated in said track support beam in a longitudinal direction of said track support beam.

Aspect 2: A drive unit according to aspect 1, where said track support beam comprises at least one partition plane 40 for uncovering an inner space of said track support beam where said electric motor is integrated.

Aspect 3: A drive unit according to aspect 2, where said partition plane is arranged to be sealable by means of a detachable cover arranged to be mounted lying against said partition plane of said track support beam.

Aspect 4: A drive unit according to any preceding aspects, where said at least one drive wheel and said electric motor are arranged to be mounted in a front section of said track support beam.

Aspect 5: A drive unit according to any preceding aspects, where said track support beam is a skid beam.

Aspect 6: A drive unit according to any preceding aspects, where an output shaft 81 of said electric motor is arranged at essentially the same height of said track support beam as a drive shaft 9 of said track support beam, said drive shaft being arranged to drive said at least one drive wheel.

Aspect 7: A drive unit according to any preceding aspects, further comprising a transmission device 6 7, 8 integrated in said track support beam such that the axial main direction of extension of the transmission device is aligned with the output shaft 81 of said electric motor.

Aspect 8: A drive unit according to any preceding aspects, where said electric motor is connected to a drive shaft 9 arranged to drive said at least one drive wheel, via a transmission device comprising a planetary gear 6, a transmission shaft 7 and a bevel gear 8, 8:1, 8:2, to which said drive shaft is connected.

Aspect 9: A drive unit according to aspect 8, where an end of said transmission shaft which is directed towards said electric motor is arranged to be connected to said planetary gear and an opposite end of said transmission shaft which is directed towards said drive shaft is arranged to be connected to said bevel gear.

Aspect 10: A drive unit according to any preceding aspects, where said at least one drive wheel is constituted by a drive wheel pair 28.

Aspect 11: A drive unit according to any preceding aspects, where said track support beam comprises an integrated lubrication system for lubrication.

Aspect 12: A drive unit according to any preceding aspects, where said track support beam comprises an integrated cooling system for cooling.

Aspect 13: A drive unit according to any preceding aspects, where said track support beam is configured for attachment to a chassis beam 45 comprising control means for controlling said electric motor.

Aspect 14: A drive unit according to any preceding aspects, where said electric motor is configured for attachment to a combustion engine 5 via a generator for power supply.

Aspect 15: A drive unit according to any preceding aspects, where said electric motor is configured for attachment to a combustion engine 5 via a generator for power supply.

Aspect 16: Tracked vehicle, comprising at least one drive unit according to any preceding aspects, where said electric motor is configured to be attached to an energy storage unit for power supply.

Aspect 17: Tracked vehicle according to aspect 16, where said tracked vehicle is a forestry machine.

Aspect 18: Tracked vehicle according to any of aspects 16 or 17, where said tracked vehicle is a forwarder.

Aspect 19: Tracked vehicle according to any of aspects 16 to 18, where said tracked vehicle is hybrid driven.

Below some additional aspects of the tracked vehicle according to the present description are listed, which aspects particularly relate to the transversal partition plane 41.

Aspect 1B: A track support beam 22 for a tracked vehicle 10, configured to support at least one drive wheel 24, 26, a set of support wheels 23 and an endless track 25, wherein the track support beam 22 comprises a transversal partition plane 41 along which the track support beam 22 is configured to be divided in a front section 22A and a rear section 22B.

Aspect 2B: A track support beam 22 according to aspect 1B, wherein said front 22A and rear 22B sections are configured for removable mounting to each other along said transversal partition plane 41.

Aspect 3B: A track support beam 22 according to aspect 1B or 2B, comprising an electric motor 3 constituting an electric drive unit arranged to drive said at least one drive wheel 24, 26, wherein the electric motor 3 is integrated in one of said front 22A and rear 22B sections constituting a motor comprised section 22A.

Aspect 4B: A track support beam 22 according to aspect 3B, further comprising a transmission device 6, 7, 8 integrated in said motor comprised section 22A of the track support beam 22.

Aspect 5B: A track support beam 22 according to aspect 4B, further comprising a lubrication system integrated in said motor comprised section 22A of the track support beam 22.

Aspect 6B: A track support beam 22 according to any of the aspects 3B-5B, wherein the transversal partition plane 41 is arranged such that the motor comprised section 22A is substantially shorter in the longitudinal direction of the track support beam than what the non-motor comprised section 22B is, and preferably shorter than a third of the entire length of the track support beam.

Aspect 7B: A track support beam 22 according to any of the aspects 1B-6B, wherein the transversal partition plane 41 is configured to give access to an inner space 43, 48 of the motor comprised section 22A by partition of the track support beam 22 along said transversal partition plane 41.

Aspect 8B: A track support beam 22 according to aspect 7B, wherein said inner space 43, 48 entirely or partly accommodates at least one of an electric motor 3, a transmission device 6, 7, 8 and a lubrication system.

Aspect 9B: A track support beam 22 according to aspect 7B or 8B, wherein said inner space comprises a chamber 43 constituting a lubricant reservoir.

Aspect 10B: A track support beam 22 according to any of the aspects 7B-9B, wherein said inner space 43, 48 is sealable via said partition plane 41 by means of a detachable sealing cover 19.

Aspect 11B: A track support beam 22 according to aspect 9B and 10B, wherein said sealing cover 19 is configured to detachably seal the chamber 43 constituting lubricant reservoir, wherein the sealing cover 19 constitutes a wall of said lubrication reservoir.

Aspect 12B: A track support beam 22 according to any of the aspects 9B-11B, wherein said chamber 43 constituting lubricant reservoir constitutes a lower chamber 43 of said inner space and wherein the inner space also comprises an upper chamber 48, situated above the lower chamber 43 and at least partly separated therefrom by means of a partition wall 54, wherein said partition wall comprises one or more opening or cavities facilitating for lubricant to flow from said upper 48 chamber to said lower chamber 43.

Aspect 13B: A track support beam 22 according to aspect 12B, wherein said electric motor 3 and/or said transmission device 7, 8, 9 entirely or partly is arranged in aid upper chamber 48.

Aspect 14B: A track support beam 22 according to any of the aspects 1B-13B, wherein the front section 22A and the rear section 22B comprises flanges 44A, 44B for detachable mounting to each other along said transversal partition plane 41.

Aspect 15B: A track support beam 22 according to any of the aspects 1B-14B, wherein the front 22A and the rear 22B section of the track support beam 22 are configured for detachable mounting to each other by means of a bolt joint 46, 47.

Aspect 16B: A track support beam 22 according to any of the aspects 1B-15B, wherein said at least one drive wheel 24, 26 and said set of support wheels 23 are rotatably attached in said track support beam 22, said at least one drive wheel being arranged to drive said endless track running over said at least one drive wheel and said set of support wheels.

Aspect 17B: A track support beam 22 according to any of the aspects 3B to 16B, wherein said electric motor 3 is integrated in said motor section 22A of the track support beam 22 in a longitudinal direction of the track support beam 22.

Aspect 18B: A track support beam 22 according to any of the aspects 3B to 17B, wherein said motor comprised section 22A of the track support beam 22 is constituted by the front section 22A.

Aspect 19B: A track support beam 22 according to any of the aspects 1B to 18B, further comprising a longitudinal partition plane 40 uncovering an inner space of said track support beam 22 in which an electric motor 3 is integrated.

Aspect 20B: A track support beam 22 according to any of the aspects 1B to 19B, where said track support beam 22 is a skid beam.

Aspect 21B: A track support beam 22 according to any of the aspects 1B to 20B, wherein said track support beam 22 is configured for attachment to a chassis beam 45 comprising control means for controlling of an electric motor 3 integrated in the track support beam 22.

Aspect 22B: A track assembly, comprising a track support beam 22 according to any of the aspects 1B to 21B.

Aspect 23B: A track assembly according to aspect 22B, comprising a track support beam 22 according to aspect 16B and an electric motor 3 integrated in the track support beam 22 configured to drive said at least one drive wheel 24, 26, wherein the track assembly constitutes a drive unit capable of being driven by itself.

Aspect 24B: A tracked vehicle 10, comprising at least one track support beam 22 according to any of the aspects 1B-21B.

Aspect 25B: Tracked vehicle 10 according to aspect 24B, where said tracked vehicle 10 is a forestry machine such as a forwarder.

The invention claimed is:

1. A drive unit for a tracked vehicle, said drive unit comprising:
   a track support beam,
   at least one drive wheel,
   a set of support wheels and
   an endless track,
   said at least one drive wheel being arranged to drive said endless track running over said at least one drive wheel and said set of support wheels,
   wherein said at least one drive wheel and said set of support wheels are rotatably attached in said track support beam,
   the drive unit further comprises an electric motor attached to said at least one drive wheel and integrated in said track support beam, and the track support beam comprises an integrated lubrication system comprising a pump unit arranged for pressurized supply of lubricant to parts of the drive unit in need of lubrication,
   the integrated lubrication system further comprises a lubricant reservoir for storage of lubricant, wherein the pump unit is arranged to pump lubricant from said lubricant reservoir to the drive unit parts in need of lubrication,
   the lubricant reservoir is placed at a lower height than at least some of the drive unit parts being supplied with the pressurized lubricant, and the lubrication system is configured such that lubricant being supplied to these drive unit parts flows back to the lubricant reservoir through influence of gravitation.

2. The drive unit of claim 1, wherein the track support beam comprises an inner space consisting of at least one upper chamber and a lower chamber, where said upper chamber accommodates at least parts of said electric motor and/or at least parts of a transmission device which are supplied with pressurized lubricant by means of said lubrication system, and where said lower chamber constitute said lubrication reservoir, wherein said upper and lower chamber at least partly are separated by a partition wall comprising at least one lead-through through which the lubricant-flows back to the lubricant reservoir.

3. The drive unit of claim 1, wherein the integrated lubrication system further comprises a pressure conduit configured to lead the pressurized lubricant from the lubricant reservoir to the drive unit parts in need of lubrication.

4. The drive unit of claim 3, wherein said pressure conduits at least partly are cast or drilled in said track support beam.

5. The drive unit of claim 1, wherein said lubricant reservoir is constituted by a recess of said track support beam.

6. The drive unit of claim 1, wherein said lubrication system is a combined lubrication and cooling system where a wall of said lubricant reservoir is arranged in direct contact with air surrounding the drive unit.

7. The drive unit of claim 1, wherein the integrated lubrication system further comprises an electric pump motor arranged to be driven by separate electric feed from said electric motor.

8. The drive unit of claim 1, wherein said pump unit is arranged inside said lubricant reservoir and configured to be in the lubricant during operation.

9. The drive unit of claim 1, wherein the track support beams comprises a transversal partition plane along which the track support beam is arranged to be divided in a front section and a rear section, wherein both the electric motor and the lubrication system are integrated in one of said front and rear section constituting a motor comprised section.

10. The drive unit of claim 9, wherein the transversal partition plane is configured to give access to an inner space of the motor comprised section by partition of the track support beam along said transversal partition plane, wherein said inner space comprises a chamber constituting said lubricant reservoir.

11. The drive unit of claim 10, wherein said inner space is sealable via said partition plane by means of a detachable sealing cover.

12. The drive unit of claim 11, wherein said sealing cover is constituted by a wall of said lubricant reservoir.

13. The drive unit of claim 1, wherein said parts of the drive unit in need of lubrication comprises said electric motor and a transmission device which also is integrated in said track support beam.

14. The drive unit of claim 1, wherein the electric motor is integrated in the track support beam in a longitudinal direction of said track support beam.

15. The drive unit of claim 1, wherein said track support beam is configured for attachment to a chassis beam comprising a controller for controlling the electric motor integrated in the track support beam.

16. The drive unit of claim 1, wherein the drive unit is constituted by a track assembly.

17. A tracked vehicle, comprising at least one drive unit of claim 1.

18. The tracked vehicle of claim 17, where said tracked vehicle is a forestry machine.

* * * * *